US010113785B2

(12) United States Patent
Melton et al.

(10) Patent No.: US 10,113,785 B2
(45) Date of Patent: Oct. 30, 2018

(54) ICE MAKING MACHINE AND ICE CUBE EVAPORATOR

(71) Applicant: HOSHIZAKI AMERICA, INC., Peachtree City, GA (US)

(72) Inventors: Glenn O'Neal Melton, Fayetteville, GA (US); Gregg M. Wolf, Peachtree City, GA (US); David Anglin Sellers, Newnan, GA (US); Jeffrey B. Tatum, Marietta, GA (US); Robert Amalfitano, Peachtree City, GA (US); Yasuki Mizutani, Okazaki (JP); Jeffrey Bion Boggs, Peachtree City, GA (US); Milaim Hoti, Peachtree City, GA (US)

(73) Assignee: Hoshizaki America, Inc., Peachtree City, GA (US)

( * ) Notice: Subject to any disclaimer, the term of this patent is extended or adjusted under 35 U.S.C. 154(b) by 0 days.

(21) Appl. No.: 15/353,833

(22) Filed: Nov. 17, 2016

(65) Prior Publication Data

US 2017/0067678 A1    Mar. 9, 2017

Related U.S. Application Data

(63) Continuation-in-part of application No. 14/022,887, filed on Sep. 10, 2013.

(Continued)

(51) Int. Cl.
*F25C 1/12* (2006.01)
*F25B 39/02* (2006.01)
(Continued)

(52) U.S. Cl.
CPC ............... *F25C 1/12* (2013.01); *B21D 22/04* (2013.01); *B21D 51/46* (2013.01); *B21D 51/48* (2013.01);
(Continued)

(58) Field of Classification Search
None
See application file for complete search history.

(56) References Cited

U.S. PATENT DOCUMENTS 2,014,703 A    9/1935  Smith
3,280,585 A   10/1966  Lowe
(Continued)

FOREIGN PATENT DOCUMENTS

EP         2400243        12/2011
KR    1020150124222       11/2015
(Continued)

OTHER PUBLICATIONS

Hoti, Milaim; Advisory Action for U.S. Appl. No. 14/022,887, filed Sep. 10, 2013, dated May 11, 2017, 3 pgs.
(Continued)

*Primary Examiner* — Allen Flanigan
(74) *Attorney, Agent, or Firm* — Taylor English Duma LLP

(57) ABSTRACT

An evaporator includes a refrigerant conduit sandwiched between front and rear plates. The front plate has inner flat portions, each of which is spaced from a respective inner flat portion of the rear plate to define a respective spaced portion. The front and rear plates further include a set of first protrusions and a set of second protrusions. Each first protrusion on the front plate faces a respective first protrusion on the rear plate to define a respective active cavity. Each second protrusion on the front plate faces a respective second protrusion on the rear plate to define a respective passive cavity. The refrigerant conduit extends through each of the active cavities but does not extend through any of the passive cavities. The location of the active and passive cavities are interspersed and separated by respective inner flat portions so as to define a plurality of ice forming sites.

19 Claims, 6 Drawing Sheets

Related U.S. Application Data

(60) Provisional application No. 61/699,171, filed on Sep. 10, 2012.

(51) Int. Cl.

| | | |
|---|---|---|
| *B21D 22/04* | (2006.01) | |
| *B23P 15/26* | (2006.01) | |
| *B21D 51/46* | (2006.01) | |
| *B21D 51/48* | (2006.01) | |
| *F28D 1/047* | (2006.01) | |
| *F28F 1/22* | (2006.01) | |
| *F25B 39/00* | (2006.01) | |
| *F28D 21/00* | (2006.01) | |

(52) U.S. Cl.
 CPC .............. *B23P 15/26* (2013.01); *F25B 39/00* (2013.01); *F25B 39/022* (2013.01); *F28D 1/0477* (2013.01); *F28F 1/22* (2013.01); *F25C 2500/02* (2013.01); *F28D 2021/0064* (2013.01); *Y10T 29/49396* (2015.01)

(56) References Cited

U.S. PATENT DOCUMENTS

| | | | |
|---|---|---|---|
| 3,511,059 A | 5/1970 | Hoenisch et al. | |
| 3,650,121 A | 3/1972 | Kimpel et al. | |
| 4,344,298 A | 8/1982 | Biemilier | |
| 4,366,679 A | 1/1983 | Van Steenburgh, Jr. | |
| 4,412,429 A | 11/1983 | Kohl | |
| 4,417,450 A | 11/1983 | Morgan, Jr. et al. | |
| 4,458,503 A | 7/1984 | Nelson | |
| 4,489,567 A | 12/1984 | Kohl | |
| 4,555,913 A | 12/1985 | Ishiguro | |
| 4,573,325 A | 3/1986 | Chiu et al. | |
| 4,580,410 A | 4/1986 | Chiyoshi | |
| 4,589,261 A | 5/1986 | Ohashi et al. | |
| 4,986,088 A | 1/1991 | Nelson | |
| 4,995,245 A | 2/1991 | Chang | |
| 5,060,484 A | 10/1991 | Bush et al. | |
| 5,097,897 A * | 3/1992 | Watanabe | F25B 39/04 165/140 |
| 5,182,925 A | 2/1993 | Alvarez et al. | |
| 5,291,752 A | 3/1994 | Alvarez et al. | |
| 5,345,782 A | 9/1994 | Takahashi et al. | |
| 5,479,707 A | 1/1996 | Alvarez et al. | |
| 5,586,439 A | 12/1996 | Schlosser et al. | |
| 6,148,621 A | 11/2000 | Byczynski et al. | |
| 6,161,396 A | 12/2000 | Allison et al. | |
| 6,205,807 B1 | 3/2001 | Broadbent | |
| 6,247,318 B1 | 6/2001 | Stensrud et al. | |
| 6,347,526 B1 | 2/2002 | Ledbetter | |
| 6,463,746 B1 | 10/2002 | Bethuy et al. | |
| 6,619,051 B1 | 9/2003 | Kilawee | |
| 6,725,675 B2 | 4/2004 | Kampert et al. | |
| 6,742,576 B2 * | 6/2004 | Bergevin | F28F 1/22 138/143 |
| 7,017,355 B2 | 3/2006 | Allison et al. | |
| 7,243,508 B2 * | 7/2007 | Sanuki | F25C 1/12 165/168 |
| 7,281,385 B2 | 10/2007 | Wakatsuki | |
| 7,340,913 B2 | 3/2008 | Miller et al. | |
| 7,556,236 B2 | 7/2009 | Slappay | |
| 7,779,641 B2 | 8/2010 | Lee et al. | |
| 8,635,877 B2 | 1/2014 | Kim et al. | |
| 8,677,774 B2 | 3/2014 | Yamaguchi et al. | |
| 8,677,777 B2 * | 3/2014 | Yamaguchi | F25C 1/12 62/347 |
| 8,857,198 B2 | 10/2014 | Styn et al. | |
| 9,017,485 B2 | 4/2015 | Murthy et al. | |
| 9,056,337 B2 | 6/2015 | Walker et al. | |
| 9,604,324 B2 | 3/2017 | An et al. | |
| 9,643,742 B2 | 5/2017 | Metzger | |
| 9,644,879 B2 | 5/2017 | Broadbent | |
| 9,688,423 B2 | 6/2017 | Metzger | |
| 9,719,710 B2 | 8/2017 | Yang | |
| 9,733,003 B2 | 8/2017 | Hoti | |
| 9,803,907 B2 | 10/2017 | Erbs et al. | |
| 9,845,982 B2 | 12/2017 | Knatt | |
| 9,857,117 B2 | 1/2018 | Kim | |
| 9,863,682 B2 | 1/2018 | Broadbent | |
| 9,869,502 B2 | 1/2018 | Gardner et al. | |
| 9,933,195 B2 | 4/2018 | Roth et al. | |
| 9,939,186 B2 | 4/2018 | Roth et al. | |
| 2004/0026599 A1 | 2/2004 | Lacan et al. | |
| 2005/0252233 A1 | 11/2005 | Sanuki et al. | |
| 2008/0264090 A1 | 10/2008 | Sowa et al. | |
| 2009/0100847 A1 | 4/2009 | Moon et al. | |
| 2009/0165492 A1 | 7/2009 | Wilson et al. | |
| 2010/0250005 A1 | 9/2010 | Hawkes et al. | |
| 2010/0257886 A1 * | 10/2010 | Suzuki | F25B 39/02 62/276 |
| 2011/0005263 A1 | 1/2011 | Yamaguchi et al. | |
| 2012/0031135 A1 | 2/2012 | Schill | |
| 2014/0138065 A1 | 5/2014 | Hoti | |
| 2015/0219380 A1 | 8/2015 | Murthy et al. | |
| 2015/0375349 A1 | 12/2015 | Gotterbarm et al. | |
| 2016/0054043 A1 | 2/2016 | Broadbent | |
| 2016/0081365 A1 | 3/2016 | Bertone | |
| 2016/0290697 A1 | 10/2016 | Broadbent et al. | |
| 2016/0298892 A1 | 10/2016 | Matsumoto | |
| 2016/0298893 A1 | 10/2016 | Knatt et al. | |
| 2016/0298894 A1 | 10/2016 | Matsumoto | |
| 2016/0370061 A1 | 12/2016 | Erbs | |
| 2017/0122643 A1 | 5/2017 | Cravens et al. | |
| 2017/0176077 A1 | 6/2017 | Knatt | |
| 2017/0205129 A1 | 7/2017 | Metzger | |
| 2017/0227274 A1 | 8/2017 | Almblad | |
| 2017/0370628 A1 | 12/2017 | Knatt | |
| 2018/0017304 A1 | 1/2018 | Knatt | |
| 2018/0031294 A1 | 2/2018 | Olson, Jr. et al. | |
| 2018/0038623 A1 | 2/2018 | Hoti | |
| 2018/0058743 A1 | 3/2018 | Vorosmarti, III et al. | |
| 2018/0106521 A1 | 4/2018 | Broadbent et al. | |

FOREIGN PATENT DOCUMENTS

| | | |
|---|---|---|
| WO | 2009134102 | 11/2009 |
| WO | 2018011711 | 1/2018 |

OTHER PUBLICATIONS

Hoti, Milaim; Advisory Action for U.S. Appl. No. 14/022,887, filed Sep. 10, 2013, dated Nov. 2, 2017, 6 pgs.

Hoti, Milaim; Applicant Interview Summary for U.S. Appl. No. 14/022,887, filed Sep. 10, 2013, dated Mar. 21, 2017, 3 pgs.

Hoti, Milaim; Final Office Action for U.S. Appl. No. 14/022,887, filed Sep. 10, 2013, dated Mar. 2, 2017, 8 pgs.

Hoti, Milaim; Final Office Action for U.S. Appl. No. 14/022,887, filed Sep. 10, 2013, dated Jun. 22, 2017, 10 pgs.

Hoti, Miliam; Non-Final Office Action for U.S. Appl. No. 14/022,887, filed Sep. 10, 2013, dated Sep. 21, 2016, 12 pgs.

Hoti, Miliam; Restriction Requirement for U.S. Appl. No. 14/022,887, filed Sep. 10, 2013, dated Jul. 6, 2016, 10 pgs.

Melton, Glenn O'Neal; Extended European Search Report for serial No. 17202170.1, filed Nov. 16, 2017, dated Apr. 5, 2018, 9 pgs.

Hoti, Milaim; Applicant-Initiated Interview Summary for U.S. Appl. No. 14/022,887, filed Sep. 10, 2013, dated Mar. 12, 2018, 3 pgs.

Hoti, Milaim; Non-Final Office Action for U.S. Appl. No. 14/022,887, filed Sep. 10, 2013, dated Dec. 15, 2017, 12 pgs.

Hoti, Milaim; Notice of Allowance for U.S. Appl. No. 14/022,887, filed Sep. 10, 2013, dated Jun. 8, 2018, 15 pgs.

* cited by examiner

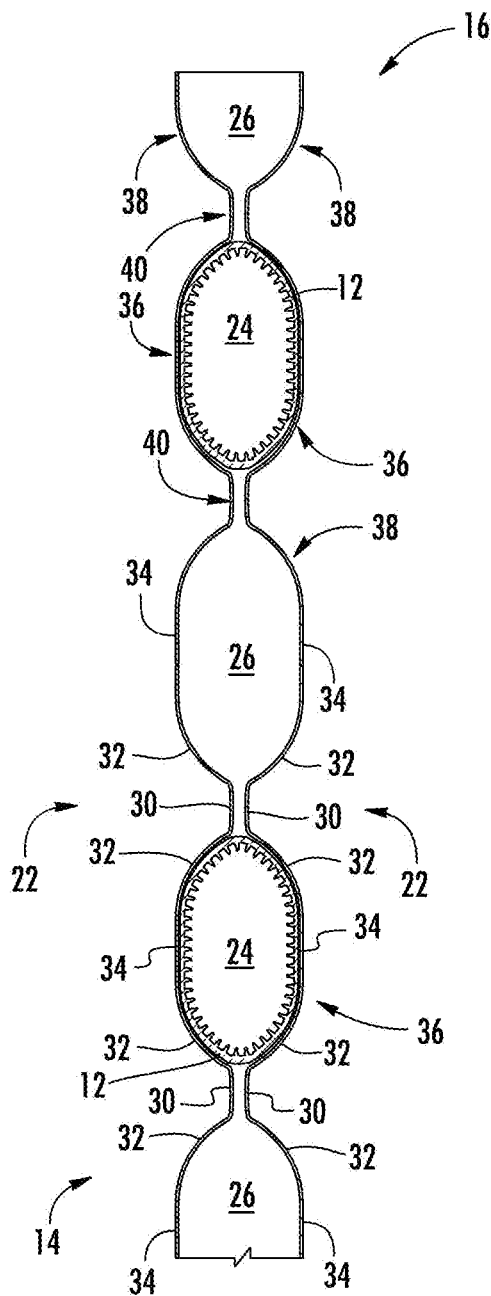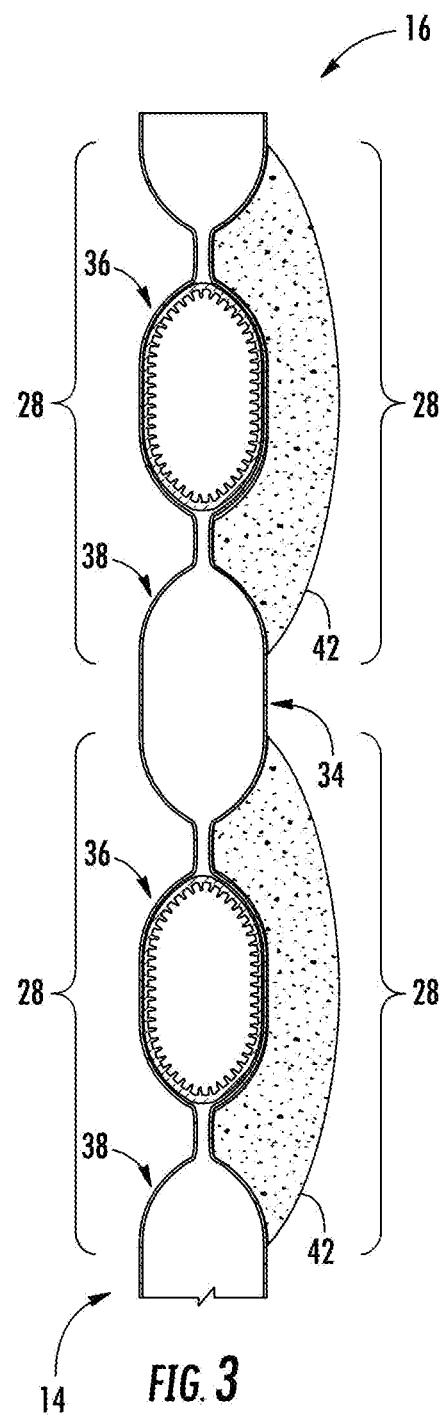
FIG. 2
FIG. 3

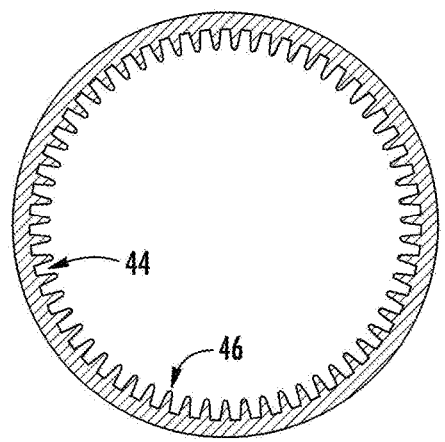
FIG. 4A
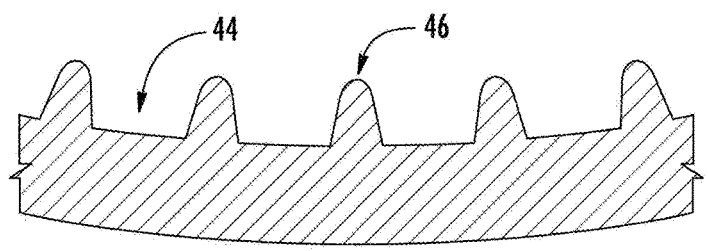
FIG. 4B
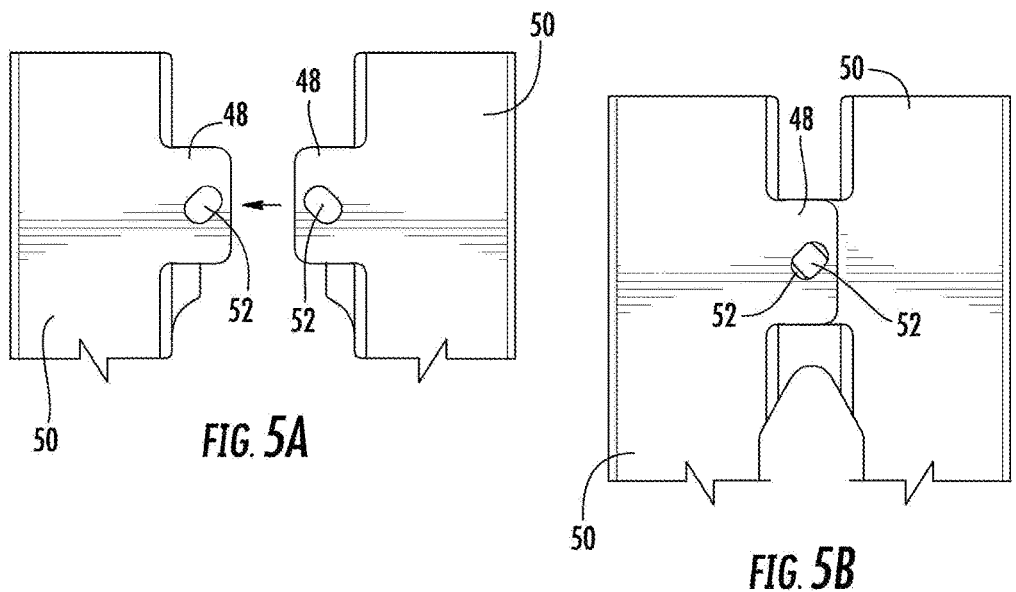
FIG. 5A
FIG. 5B

ICE MAKING MACHINE AND ICE CUBE EVAPORATOR

RELATED APPLICATIONS

This application is a continuation-in-part of U.S. application Ser. No. 14/022,887 filed Sep. 10, 2013, which itself claims the benefit of U.S. Provisional Application No. 61/699,171, filed Sep. 10, 2012. The disclosures of these applications are incorporated herein by reference.

BACKGROUND OF THE INVENTION

The present invention relates to an evaporator, an ice making machine incorporating the evaporator, and a process for making the evaporator.

Automatic ice making machines are well known and are typically found in food and drink service establishments, hotels, motels, sports arenas, and various other places where large quantities of ice are needed on a continuous basis. Some automatic ice making machines produce flaked ice while others produce ice shaped in a variety of configurations, which are commonly referred to as cubes or nuggets.

Automatic ice making machines generally include a refrigeration system having a compressor, a condenser, an evaporator, and an expansion valve. A series of individual ice forming sites are formed on the evaporator and water is supplied to those sites by a water supply system by, for example, trickling or spraying water onto the ice forming site. The run-off of the water is usually recirculated within the water supply. The trickling or spraying methods of supplying water are normally preferred because the methods produce clear ice while the static filled pockets method generally produces white or opaque ice.

Automatic ice making machines are normally controlled as a function of the amount of ice in an ice bin of the ice making machine. When the supply of ice in the ice bin is insufficient, automatic controls cycle the ice making machine through ice production and ice harvest to supplement the supply of ice in the storage portion. In the ice production mode, the refrigeration system operates in a normal manner such that expanding refrigerant in the evaporator removes heat from the series of ice forming sites, freezing the water to form an outwardly growing layer of ice. When the ice thickness reaches a predetermined condition or a specified time period has elapsed, the ice making machine switches to harvest mode.

Typically the harvest mode involves a valve change which directs hot refrigerant gasses to the evaporator. The ice forming locations are heated by the hot refrigerant gasses until the ice in contact with the evaporator begins to thaw. Once the ice falls from the evaporator, it is collected by an appropriate ice bin. When more ice is required, the refrigerant system is switched back to the production mode and the cycle begins again. These cycles continue until there is sufficient ice in the ice bin.

In accordance with one aspect of the invention, an evaporator comprises a refrigerant conduit and front and rear plates sandwiching the refrigerant conduit. The front and rear plates have inner flat portions, each inner flat portion of the front plate facing, but being spaced from, a respective inner flat portion of the rear plate to define a respective spaced portion. The front and rear plates also include a set of first protrusions, each first protrusion on the front plate facing a respective first protrusion on the rear plate to define a respective active cavity. The refrigerant conduit extends through each of the active cavities. The front and rear plates further include a set of second protrusions, each second protrusion on the front plate facing a respective second protrusion on the rear plate to define a respective passive cavity. The refrigerant conduit does not extend through any of the passive cavities. The location of the active and passive cavities are interspersed and separated by respective inner flat portions so as to define a plurality of ice forming sites.

In a preferred embodiment, the evaporator uses a single refrigerant conduit having a serpentine shape. However, a plurality of refrigerant conduits can be used. For example, a first refrigerant conduit can be used for the upper half of the evaporator and a second refrigerant conduit can be used for the lower half of the evaporator. In either case, a portion of at least one of the refrigerant conduits preferably extends through each of the active cavities.

The refrigerant conduit is preferably a pipe having grooves formed along its inner surface so as to increase the inner surface area of the pipe and thereby improve the heat transfer between the refrigerant flowing through the pipe and the ice forming surfaces of the protrusions defining the ice forming cavities. The inner groves preferably run helically along the inner surface of the pipe.

Each active cavity is preferably surrounded by a pair of inactive cavities which are connected to the active cavity by respective spaced portions. The spacing between the inner flat faces defining the respective spaced portions, as measured along a line running perpendicular to the flat faces is preferably between 1 and 2 mm. This is important because if the flat portions abut one another it has been found that corrosion can occur.

It has also been found that spaces between the inner walls of the active cavities and the refrigerant conduit passing through them can lead to corrosion of the protrusions forming the active cavities. This can lead to holes being formed in the protrusions which can allow water to enter the active cavities. If that happens water can freeze and melt during the ice making and ice harvesting cycles and can deform the plate and/or the refrigerant conduit. This decreases the heat transfer between the refrigerant in the refrigerant conduit and the outer surfaces of the active cavities and eventually can block refrigerant from passing through the refrigerant conduit. In order to avoid this problem, it is preferred that the outer surfaces of the refrigerant are pressed against (abut) the inner surfaces of the protrusions except for the area where the spaced portions meet the active cavity.

In the preferred embodiment, each protrusion of the respective pair has an outer flat portion surrounded by a pair of curved portions extending from the outer flat portion to the respective pair of inner flat portions. The refrigerant conduit takes the same form.

In one embodiment, the front and rear plates are connected to one another by an appropriate fastener such as bolts or rivets which extend through elongated slots in the front and rear plates. Because the slots are elongated, and preferably formed at a 45 degree angle with respect to the plane in which the inner flat portions lie, the slots need not be perfectly located in order to ensure that they will overlap allowing for easier assembly of the evaporator.

Each of the front plate and the rear plate preferably includes a plurality of fins, which divide each of the front plate and the rear plate into a plurality of ice forming columns each including a plurality of ice forming sites. The ice forming columns preferably run parallel to one another and perpendicular to the direction that the at least one refrigerant conduit passes through the active cavities.

In another aspect of the invention, an ice making system comprises a refrigerant system for circulating cold refrigerant through an evaporator and a source of water applying liquid water to the evaporator to form ice on the evaporator. The evaporator includes a refrigerant conduit and front and rear plates sandwiching the refrigerant conduit. The front and rear plates have inner flat portions, each inner flat portion of the front plate facing, but being spaced from, a respective inner flat portion of the rear plate to define a respective spaced portion. The front and rear plates also include a set of first protrusions. Each first protrusion on the front plate faces a respective first protrusion on the rear plate to define a respective active cavity. The refrigerant conduit extends through each of the active cavities. The front and rear plates further include a set of second protrusions. Each second protrusion on the front plate faces a respective second protrusion on the rear plate to define a respective passive cavity. The refrigerant conduit does not extend through any of the passive cavities. The locations of the active and passive cavities are interspersed and separated by respective inner flat portions so as to define a plurality of ice forming sites. The source of water applies liquid water to the first and second plates whereby ice is formed at the ice forming sites.

The source of refrigerant can switch between a cooling cycle, in which cooling refrigerant is passed through the refrigerant conduit(s) and ice is formed, and a harvesting cycle, wherein a warming refrigerant is passed through the refrigerant conduit(s) and ice falls off of the ice forming sites and is harvested.

In at least one other aspect of the invention, the front plate or the rear plate or the front plate and the rear plate are formed, in part, by bending a flat plate to include the plurality of fins which divide the plate into a plurality of fins to divide them into a plurality of ice forming columns. Each ice forming column preferably includes a plurality of ice forming sites. To assist in this process, notches are formed on the top and/or bottom edges of the flat plate at locations corresponding to the locations of the fins. The fins are then formed by bending the flat plates in a preferably triangular shape while using the notches to determine where to form the fins.

BRIEF DESCRIPTION OF THE DRAWINGS

FIG. 2 is a cross sectional view of portion of the evaporator of FIG. 1 taken along lines 2-2 of FIG. 1.

FIG. 3 is the same cross sectional view as FIG. 2 but shows the formation of ice cubes on some of the ice forming sites.

FIG. 4A is a cross sectional view of a pipe forming a preferred embodiment of the refrigerant conduit forming part of the evaporator of FIG. 1.

FIG. 4B is an enlarged view of a portion of the pipe shown in FIG. 4A.

FIGS. 5A and 5B are enlarged views showing a portion of the outermost fins of the front and rear plates of the evaporator of FIG. 1 before and after the two plates are connected together.

DETAILED DESCRIPTION OF THE PREFERRED EMBODIMENTS

Figure 1:
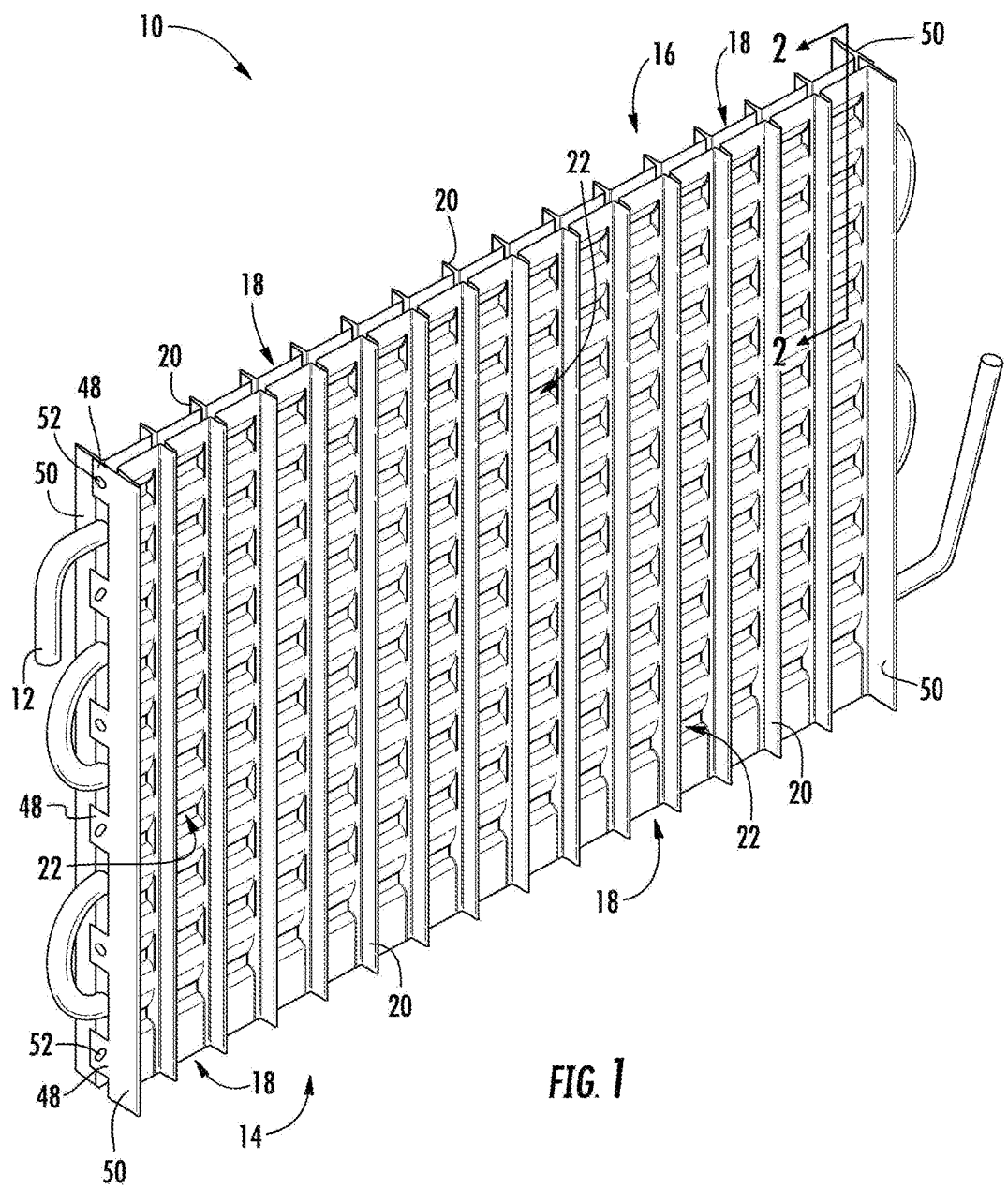
FIG. 1 is an isometric view of an evaporator constructed in accordance with the principles of the present invention.

Referring now to the drawings wherein like numerals indicate like elements, there is shown in FIG. 1 an evaporator 10 comprising a serpentine refrigerant conduit 12 sandwiched by front and rear plates 14 and 16. The refrigerant conduit can be considered a coolant conduit. The front and rear plates 14, 16 are preferably divided into a plurality of vertically extending ice forming columns 18 by a plurality of fins 20. A plurality of depressions 22, which can be considered dimples, are formed in the ice forming columns 18. In a preferred embodiment, the front and rear plates 14, 16 are formed from respective flat metal sheets. The sheets are first bent at spaced locations to form the fins 20. Thereafter depressions 22 are formed in the front and rear plates 14, 16 using tools similar to those shown in U.S. application Ser. No. 14/022,887. When these tools are used, the portion of the refrigerant conduit 12 located adjacent to the depressions 22 is similarly deformed. However, as will become clearer below, the shape of the depressions 22 in the present embodiment is different than the shape of the depressions in U.S. application Ser. No. 14/022,887 in order to achieve various improvements in the structure of the evaporator.

As best shown in FIGS. 2 and 3, the depressions 22 are formed in the front and rear plates to form active cavities 24 and passive cavities 26. The refrigerant conduit 12 passes through the active cavities 24 but not through the passive cavities 26. As a result, the active cavities 24 are cooled by the refrigerant passing through the refrigerant conduit 12 during the ice forming cycle and, when water is applied to the surfaces of the front and rear plates 14, 16, will form ice cubes on ice forming sites 28 described in further detail below.

The depressions 22 have an inner flat portion 30 surrounded by two curved portions 32 which terminate at an outer flat portion 34 located between adjacent depressions. In the preferred embodiment, the inner flat portions 30 lie in a first plane and the outer flat portions 34 lie in a second plane, parallel to and spaced from the first plane. Each inner flat portion 30 on front plate 14 opposes a corresponding inner flat portion 30 on the rear plate 16 but is spaced from the opposed inner flat portion.

The combination of the curved portions 32 and the outer flat portions 34 on the front plate 14 define a series of first and second protrusions 36, 38 on the front plate 14, and the combination of the curved portions 32 and the outer flat portions 34 on the rear plate 16 similarly define a series of first and second protrusions 36, 38 on the rear plate 16. Each first protrusion 36 on the front plate 14 opposes a corresponding first protrusion on the rear plate 16 to form a respective active cavity 24. Each second protrusion 38 and the front plate 14 opposes a corresponding second protrusion on the rear plate 16 to form a respective passive cavity 26. Respective pairs of inner flat portions 30 face one another to form respective spaced portions 40. As noted above, it has been found that if the inner flat portions 30 abut one another corrosion can occur. To avoid this problem, the opposed inner flat portions are spaced apart, preferably by 1-2 mm.

Each first protrusion 36 (forming part of a respective active cavity 24) is located between an adjacent pair of second protrusions 38 (forming part of respective passive cavities 26) and is connected thereto by respective spaced portions 40.

A portion of the refrigerant conduit 12 passes through and is in thermal contact (and more preferably in direct physical contact) with the first and second protrusions 36, 38 forming each of the active cavities 40. As a result, there is an efficient transfer of heat from the refrigerant in the refrigerant conduit 12 to the outer surface of the first protrusions 36. This will define the heart of the ice forming site 28—ice will form on the first protrusion 36 and will grow laterally outwardly, preferably onto its adjacent inner flat portions 30 and onto at least part of the curved portions 32 of the adjacent second protrusions 38 forming part of the adjacent passive cavities 26.

This is best seen in FIG. 3, which shows the formation of ice cubes 42 on the rear plate 16. Similar ice cubes, not shown, will be formed on the ice forming sites 28 of the front plate 14. The degree to which the ice extends over the inner flat portions 30 and the adjacent second protrusions 38 is determined, at least in part, by the length of time that water is applied to the front and rear plates 14, 16 during the ice forming cycle.

Once ice cubes 42 of sufficient size have been formed, the system will switch to a harvesting cycle wherein relatively warm coolant is passed through the refrigerant conduit 12 and the ice cubes 42 will separate from the ice forming sites 28 and be collected in an ice bin 60 discussed further below.

In the preferred embodiment, a single refrigerant conduit 12 having a serpentine shape is used. It includes a plurality of straight portions which run perpendicular to the ice forming columns 18 and curved portions located outside of the front and rear plates 14, 16 and connecting the straight portions. While a single refrigerant conduit 12 is preferred, more than one conduit can be used. By way of example and not limitation, a first cooling conduit can be used for the upper half of the evaporator 10 and a second cooling conduit can be used for the lower half of the evaporator 10.

The refrigerant conduit 12 is preferably a round pipe. However, during assembly of the evaporator 10, the pipe is placed between the front and rear plates 14, 16 and dies or other means are used to form the depressions 22 (and therefore the active and passive cavities 24, 26) thereby deforming portions of the pipe extending between the front and rear plates 14, 16 into the generally ovoid shape shown in FIGS. 2 and 3. As a result, the outer surface of the pipe and the inner surface of the active cavities 40 are pressed against one another. This ensures good thermal conduction between the refrigerant passing through the refrigerant conduit 12 and the outer surfaces of the first protrusions 36. In the preferred embodiment, the outer surface of the refrigerant conduit 12 directly abuts the inner surface of the first protrusions 36. However, it is possible to provide another material interfacing those surfaces as long as the material has a sufficiently high thermal conductivity to ensure efficient transfer of energy between the outer surface of the first protrusion 36 and the coolant passing through the refrigerant conduit 12.

To further improve the thermal conductivity between the refrigerant and the outer surfaces of the first protrusion 36, grooves 44 (see FIGS. 4A and 4B) are preferably formed on the inner surface of the refrigerant conduit 12 to increase its inner surface area. The grooves preferably run in a helical manner relative to an axial center of the refrigerant conduit 12. The grooves 44 define projections 46 having the shape shown in FIG. 4B. More particularly, they are wider at their proximal base than at their distal tip and the tips are preferably rounded.

As best shown in FIGS. 1, 5A, and 5B, projections 48 are formed on the outermost fins 50 and elongated slots 52 are formed in the projections 48 to receive rivets, bolts, or other connection means (not shown) to hold the front and rear plates 14, 16 together. The elongated slots are preferably formed at a 45 degree angle relative to the plane of the inner flat portions 30 and at 90 degrees with respect to one another.

In the past, round rivet receiving holes had been formed in the projections. However, this often made it difficult to pass the rivet through the holes due to tolerance errors or other variations in the process of forming the evaporator 10. The use of these elongated slots 52, especially when they run at a 45 degree angle relative to the plane of the inner flat portions 30 and at 90 degrees with respect to one another, overcomes this problem.

Figure 6:
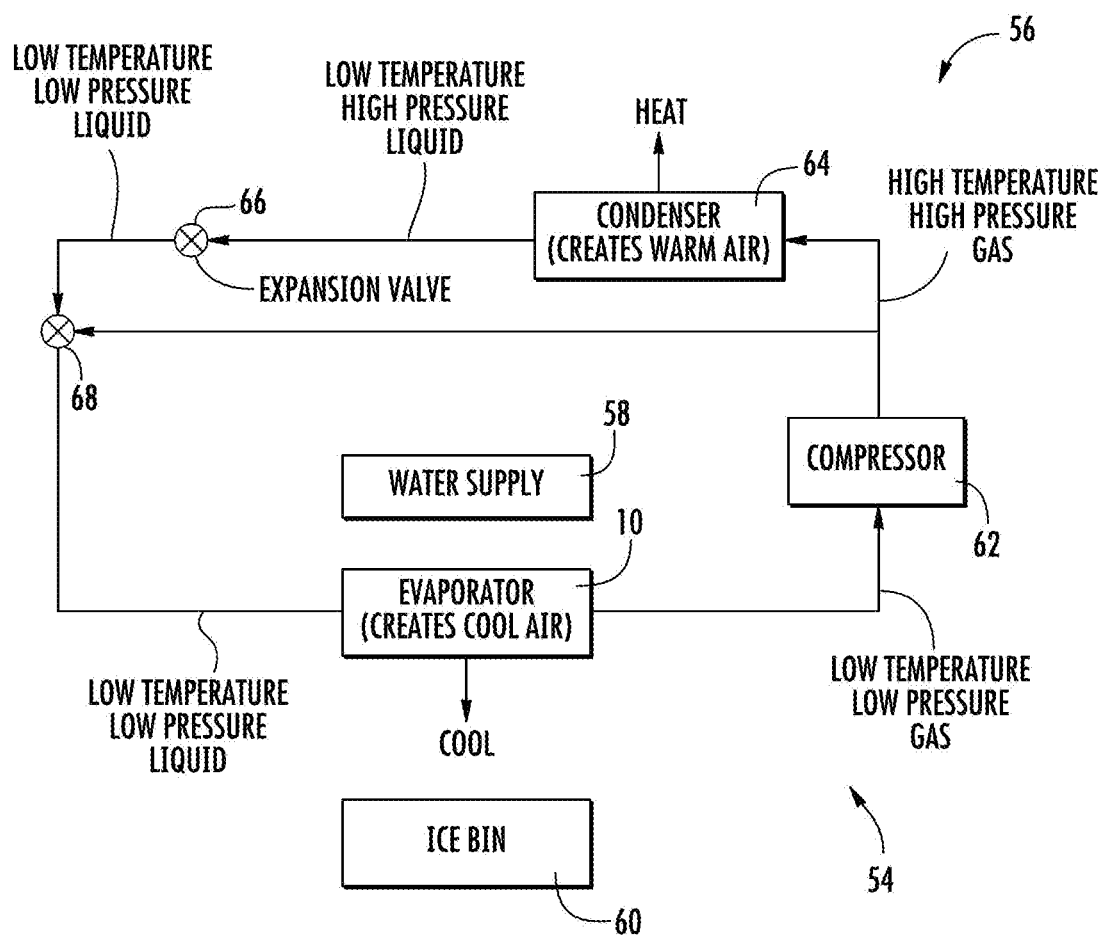
FIG. 6 is a schematic view of an icemaker incorporating the evaporator of FIG. 1.

An ice forming machine 54 incorporating the evaporator 10 of the present invention is shown schematically in FIG. 6. The ice forming machine 54 includes a refrigerant system 56, a water supply 58, and an ice bin 60. The evaporator 10 forms part of the refrigerant system 56 which also includes a compressor 62, a condenser 64, and an expansion valve 66. The refrigerant system 56 preferably includes a valve 68, which switches between a first position where it passes low-temperature, low-pressure liquid refrigerant exiting the expansion valve 66 to the refrigerant conduit 12 of the evaporator 10 and a second position where it passes high-temperature, high-pressure gas existing the compressor 62 to the refrigerant conduit 12. A controller (not shown) detects how much ice is in the ice bin 60 and moves the refrigeration system between ice production and ice harvesting modes as a function thereof. When the controller determines that there is insufficient ice in the ice bin 60, it moves valve 68 into its first position so that low-temperature, low-pressure liquid coolant is supplied to the refrigerant conduit 12 thereby initiating the ice production mode. The controller maintains the valve 60 in this position until sufficiently sized ice cubes 42 are formed on the ice forming sites 28 and then switches the valve 68 into the second mode so that high-temperature, high-pressure coolant gas is supplied to refrigerant conduit 12 to thereby begin operation in the ice harvesting mode. During this mode, the temperature of the surface of the ice forming sites 28 will be raised and the ice cubes 42 will eventually separate from the ice forming sites 28 and be collected in the ice bin 60. If, after the harvesting mode has ended, there is still insufficient ice in the ice bin 60, the controller will recycle the refrigerant system 56 through the ice forming and ice harvesting modes until there is a sufficient level of ice in the ice bin 60. Once a sufficient amount of ice is in the ice bin 60, the controller will typically shut down the refrigerant system 56 until additional ice is required.

Figure 7A:
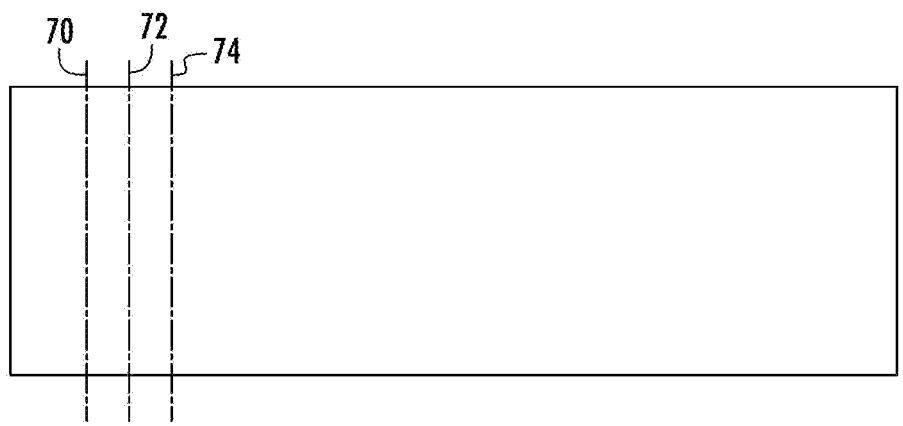
FIG. 7A is a plan view of a flat sheet used to construct the front or rear plate of the evaporator of FIG. 1.
Figure 7B:
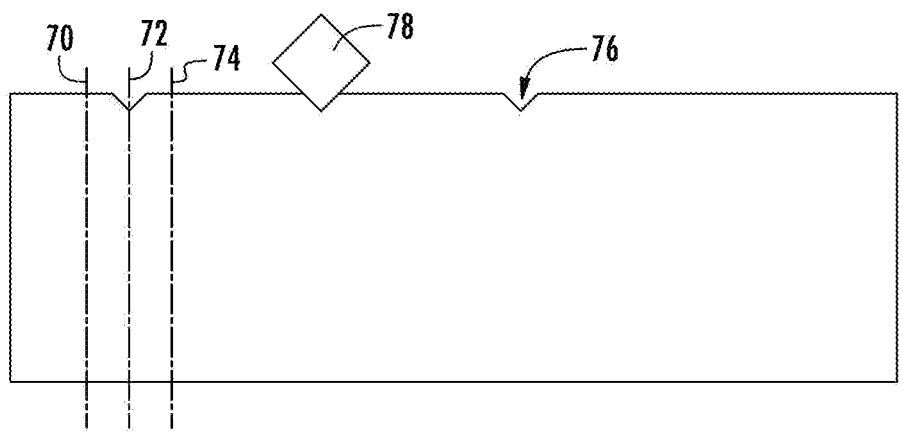
FIG. 7B is a plan view of the flat sheet of FIG. 7A wherein notches have been added to the sheet to assist in the accurate formation of fins in the flat sheet.
Figure 7C:
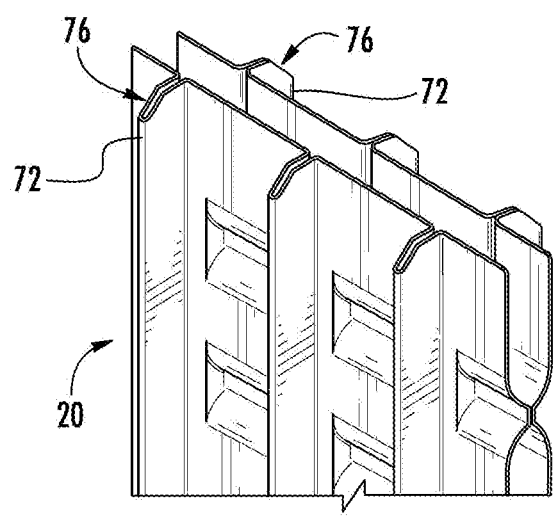
FIG. 7C is an isometric view showing fins of the front and rear plates of the evaporator of FIG. 1 when the plates are formed using the notches of FIG. 7B.
Figure 8A:
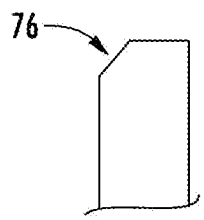
FIGS. 8A through 8H show alternative shapes for the notches of FIG. 7B.
Figure 8B:
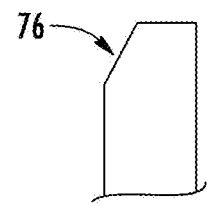
Figure 8C:
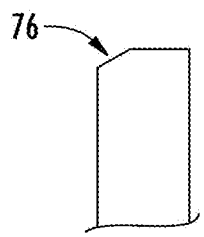
Figure 8D:
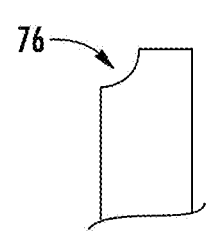
Figure 8E:
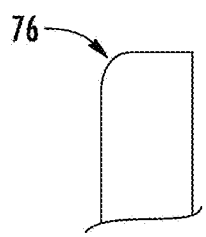
Figure 8F:
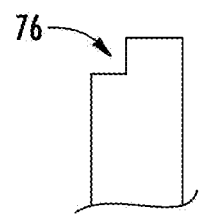
Figure 8G:
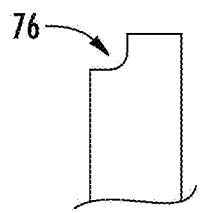
Figure 8H:
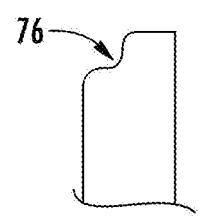

A process for forming the fins 20 in the front and rear plates 14, 16 will now be described with reference to FIGS. 7A, 7B and 7C. As shown in FIGS. 7A and 7B, each front and rear plate starts out as a rectangular, typically metal, plate. The fins 20 have to be formed at preferably equally spaced locations along the plate (only one such location is shown in FIG. 7A). Each fin 20 is formed by a bending machine (not shown) which bends the plate along three lines 70, 72, and 74 to form the triangular fin 20 shown in FIG. 7C.

After a given fin 20 is formed, a plate roller machine (not shown) moves the plate by a distance corresponding to the desired distance between adjacent fins 20. However, due to slippage and other variables, for example if the feeding direction is not perpendicular to the location of the bending machine, it is difficult to accurately and reliably do so. In order to overcome this problem, the present aspect of the invention adds notches 76 to at least one of the side surfaces of the plate. The spacing of the notches 76 corresponds to the desired spacing of the fins 20. In the preferred embodiment, the notches 76 are located at the center line 72 corresponding to the center of the fins 20. However, the notches 76 need not be located at this position as long as they have a spacing which allows the plate roller machine to accurately locate the center line 72 of the fins 20. A locator 78 is then used to locate the position of the notch 76 and a controller (not shown) uses this information to cause the plate roller machine to accurately position the sheet relative to the bending machine, thereby ensuring that the fins 60 are formed at the correct locations.

Because of the use of the notches 76, the top and/or bottom of the front and rear plates 14, 16 will include a chamfer as shown in FIG. 7A. In the preferred embodiment, the notch 76 is a triangular notch and the chamfer has the shape shown. However, the notches can take other shapes (e.g., round, square, etc.) resulting in different chamfer profiles (as projected along a plane running perpendicular to the plane of the inner flat portions 30) such as those shown in FIGS. 8A-8H.

While the invention has been described in conjunction with regards to specific aspects, it is evident that various changes and modifications may be made, and the equivalents substituted for elements thereof without departing from the true scope of the invention. In addition, many modifications may be made to adapt a particular situation or material to the teachings of the invention without departing from the scope thereof. Therefore, it is intended that this invention not be limited to the particular aspects disclosed herein, but will include all embodiments within the spirit and scope of the disclosure.

What is claimed is:

1. An evaporator comprising:
   a refrigerant conduit; and
   front and rear plates sandwiching the refrigerant conduit, each of the front and rear plates having:
   inner flat portions, each inner flat portion of the front plate facing, but being spaced from, a respective inner flat portion of the rear plate to define a respective spaced portion;
   a plurality of fins dividing the respective plate into a plurality of ice forming columns;
   a set of first protrusions defined in the respective ice forming columns, each first protrusion on the front plate facing a respective first protrusion on the rear plate to define a respective active cavity, the refrigerant conduit extending through each of the active cavities; and
   a set of second protrusions defined in the respective ice forming columns, each second protrusion on the front plate facing a respective second protrusion on the rear plate to define a respective passive cavity, the refrigerant conduit not extending through any of the passive cavities;
   wherein the active and passive cavities are interspersed and separated by respective inner flat portions so as to define a plurality of ice forming sites in the ice forming columns of the respective plate.

2. The evaporator of claim 1, wherein the refrigerant conduit has a serpentine shape.

3. The evaporator of claim 2, wherein the refrigerant conduit is a pipe having grooves formed along its inner surface.

4. The evaporator of claim 3, wherein the grooves run helically along the inner surface of the pipe.

5. The evaporator of claim 1, wherein the spacing between each respective pairs of inner flat faces defining a respective spaced portion is between 1 and 2 mm as measured along a line running perpendicular to the inner flat faces.

6. The evaporator of claim 1, wherein, for each active cavity, the entire inner surface of the first protrusion that defines the active cavity is in thermal contact with the outer surface of the refrigerant conduit extending through the active cavity.

7. The evaporator of claim 6, wherein, for each active cavity, the entire inner surface of the first protrusion that defines the active cavity abuts the outer surface of the refrigerant conduit extending through the active cavity.

8. The evaporator of claim 6, wherein each of the first protrusions defining a respective active cavity has an outer surface including an outer flat portion surrounded by a pair of curved portions extending from the outer flat portion to the respective pair of inner flat portions.

9. The evaporator of claim 8, wherein the inner flat portions lie in a first plane and the outer flat portions lies in a second plane spaced from the first plane.

10. The evaporator of claim 1, wherein the front and rear plates are connected to one another by fasteners extending through elongated slots in the front and rear plates.

11. The evaporator of claim 10, wherein the elongated slots are formed in outermost fins of the front and rear plates.

12. The evaporator of claim 1, wherein the ice forming columns are parallel to one another.

13. The evaporator of claim 12, wherein the refrigerant conduit extends through at least some of the active cavities in a direction perpendicular to the direction of the ice forming columns.

14. The evaporator of claim 1, wherein each of the plurality of fins has upper and lower ends which, when projected onto a plane running perpendicular to the inner flat portions, each define a notch.

15. A method for making an evaporator, the method comprising:
   forming front and rear plates of the evaporator from respective flat plates, each of the front and rear plates further comprising:
   inner flat portions, each inner flat portion of the front plate facing, but being spaced from, a respective inner flat portion of the rear plate to define a respective spaced portion;
   a plurality of fins dividing the respective plate into a plurality of ice forming columns;
   a set of first protrusions defined in the respective ice forming columns, each first protrusion on the front plate facing a respective first protrusion on the rear plate to define a respective active cavity; and
   a set of second protrusions defined in the respective ice forming columns, each second protrusion on the front plate facing a respective second protrusion on the rear plate to define a respective passive cavity;
   wherein the active and passive cavities are interspersed and separated by respective inner flat portions so as to define a plurality of ice forming sites in the ice forming columns of the respective plate;

forming each of the plurality of fins by bending the flat plates into a triangular shape; and sandwiching a refrigerant conduit of the evaporator between the front and rear plates, the refrigerant conduit extending through each of the active cavities but not extending through any of the passive cavities.

16. An ice making system comprising:

a refrigerant system for circulating cold refrigerant through an evaporator, the evaporating including:
   a refrigerant conduit; and
   front and rear plates sandwiching the refrigerant conduit, the front and rear plates having:
      inner flat portions, each inner flat portion of the front plate facing, but being spaced from, a respective inner flat portion of the rear plate to define a respective spaced portion;
      a plurality of fins dividing the respective plate into a plurality of ice forming columns;
      a set of first protrusions defined in the respective ice forming columns, each first protrusion on the front plate facing a respective first protrusion on the rear plate to define a respective active cavity, the refrigerant conduit extending through each of the active cavities; and
      a set of second protrusions defined in the respective ice forming columns, each second protrusion on the front plate facing a respective second protrusion on the rear plate to define a respective passive cavity, the refrigerant conduit not extending through any of the passive cavities;
      wherein the location of the active and passive cavities is interspersed and separated by respective inner flat portions so as to define a plurality of ice forming sites in the ice forming columns of the respective plate; and
   a source of water applying liquid water to the front and rear plates whereby ice will be formed at the respective ice forming sites.

17. The evaporator of claim 1, wherein each of the front and rear plates defines a top edge and a bottom edge, each of the top edge and the bottom edge of each of the front and rear plates defining a plurality of notches, each notch of the plurality of notches defined in a one of the plurality of fins.

18. The method of claim 15, wherein each of the respective flat plates defines a top edge and a bottom edge, the method further comprising forming a plurality of notches in each of the top edge and the bottom edge of the respective flat plates, each notch of the plurality of notches defined in a portion of the respective flat plate defining a one of the plurality of fins.

19. The system of claim 16, wherein each of the front and rear plates defines a top edge and a bottom edge, each of the top edge and the bottom edge of each of the front and rear plates defining a plurality of notches, each notch of the plurality of notches defined in a one of the plurality of fins.

* * * * *